United States Patent [19]

van Dijk

[11] Patent Number: 4,633,617
[45] Date of Patent: Jan. 6, 1987

[54] APPARATUS FOR GRINDING A TRANSVERSE ELEMENT FOR A DRIVING BELT

[75] Inventor: Johannes A. van Dijk, Eindhoven, Netherlands

[73] Assignee: Van Doorne's Transmissie B.V., Tilburg, Netherlands

[21] Appl. No.: 670,846

[22] Filed: Nov. 13, 1984

[30] Foreign Application Priority Data

Nov. 11, 1983 [NL] Netherlands .......................... 8303870

[51] Int. Cl.$^4$ .............................................. B24B 7/10
[52] U.S. Cl. ......................................... 51/73 R; 51/96
[58] Field of Search ................ 51/40, 47, 73 R, 94 R, 51/96, 234, DIG. 14

[56] References Cited

U.S. PATENT DOCUMENTS

| 1,901,181 | 3/1933 | McCabe | 51/73 R |
| 2,541,873 | 2/1951 | Holman | 51/73 R X |
| 2,633,675 | 4/1953 | Ellis | 51/234 X |
| 2,697,312 | 12/1954 | Kallenborn et al. | 51/96 X |
| 3,853,499 | 12/1974 | Larson et al. | 51/73 R X |

FOREIGN PATENT DOCUMENTS

| 7801101 | 8/1979 | Netherlands . |
| 94507 | 6/1922 | Switzerland . |
| 6978 | of 1894 | United Kingdom ..................... 51/73 |

OTHER PUBLICATIONS

Patents Abstract of Japan, vol. 7, No. 141, (M-223) (1286).
IBM Technical Disclosure Bulletin, vol. 17, No. 12, May 1975, p. 3523, Parker et al., *Grinding Machine*.

*Primary Examiner*—Robert P. Olszewski
*Attorney, Agent, or Firm*—Cushman, Darby & Cushman

[57] ABSTRACT

A driving belt of the type comprising an endless carrier supporting a plurality of transverse elements is disclosed. The element includes at least one recess for receiving the carrier and is provided with a convex surface in the longitudinal and transverse directions for contacting the carrier. A method and apparatus for producing the curved surface includes a stationary hollow cylindrical grinding wheel and an apparatus for moving the element in an arcuate path while contacting the grinding wheel. An alternative embodiment provides for the element to remain stationary and the rotating grinding wheel moving in an arcuate path to produce the convex surface.

1 Claim, 7 Drawing Figures

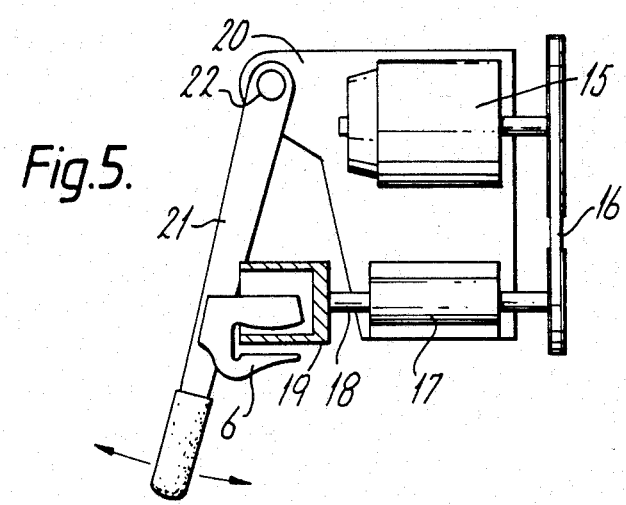
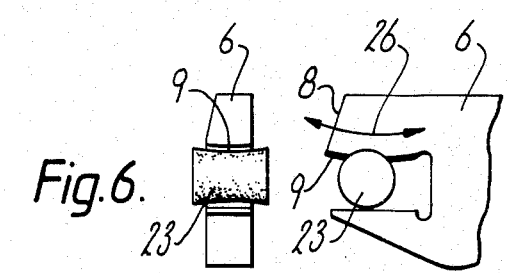
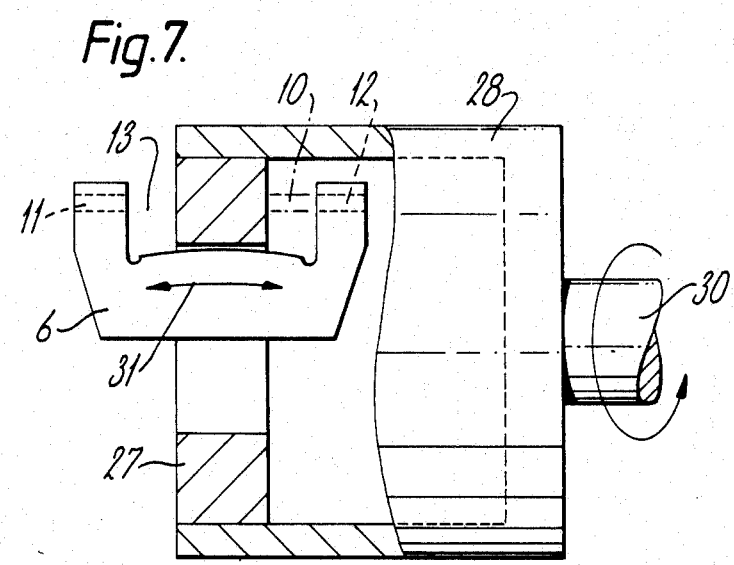

APPARATUS FOR GRINDING A TRANSVERSE ELEMENT FOR A DRIVING BELT

BACKGROUND OF THE INVENTION

This invention relates to a transverse element for a transmission belt of the kind constructed of a flexible endless carrier and a plurality of plate-like elements mounted transversely on the carrier in a face-to-face abutting relationship. The invention further relates to method and means for machining the wear surfaces of these transverse elements.

The transmission belt is of a type for use with V-shaped pulleys. The belt normally comprises a carrier in the form of an endless metal band or a pair of bands. A plurality of plate-like elements are slidably mounted on the carrier and it is these elements which contact the pulleys. In such a transmission belt the transverse elements are made of a hard material, usually metal, and because they slide on the carrier with some clearance there is some wearing of the contacting surfaces.

It has been found that when the belt has to transmit great forces for extended periods of time, the carrier is in contact with the transverse elements in such a manner that the carrier may be damaged. It has also been found that the damage or wear occurs along the sides of the carrier where they contact the transverse elements.

In the past, attempts have been made to control this wear between the carrier and the transverse elements. One such attempt is shown in U.S. Pat. No. 4,080,841 where the surface which comes into contact with the inner surface of the carrier is convexly curved in the transverse direction. In spite of this proposed remedy excessive wear on the carrier has still been experienced. The transverse elements are arranged on the carrier to slide and tilt and this tilting causes the sharp edge of the transverse element to cut into the carrier under relatively high forces. This cutting results in premature belt failure.

BRIEF SUMMARY OF THE INVENTION

The present invention overcomes the problems and disadvantages of the prior art by machining the contact surfaces of the transverse element to produce a wear or contact surface having a convex curvature in two mutually perpendicular directions. This convex surface has been found to avoid much of the wear on the carrier extending the useful life of the belt considerably. The machining removes the otherwise sharp edges of the contact surface from coming into contact with the carrier avoiding the stresses otherwise encountered due to the transverse element tilting as it enters between the sheaves of the V-shaped pulley.

In one embodiment of the machining process, the curved surface is machined with a hollow cylindrical rotating grinding device. The cylinder is provided with an abrasive material on the inner surface. The cylinder is rotated about its axis and simultaneously moving the cylinder in an arcuate path perpendicular to the axis of rotation. The wear surface of the transverse element contacts the inner surface of the cylinder while moving in this arcuate path producing a convexly curved surface in the longitudinal direction of the transverse element corresponding to the radius of the cylinder. A convex surface is also produced on the contact surface corresponding to the arcuate path of the cylinder perpendicular to its axis. A clamping device for the transverse element may also be provided to secure the element stationary during the machining process.

A second embodiment provides for a rotating grinding wheel having its abrading face concave. The concave surface corresponds to the convex surface in the transverse direction of the transverse element as the grinding wheel is moved in an arcuate path across the contact face of the transverse element.

It has been known from the '841 patent to simultaneously machine a plurality of transverse elements using an abrasive belt which removes more material on the edges than in the center. This has not been satisfactory for producing the desired curves and does not result in consistent curves under all conditions.

BRIEF DESCRIPTION OF THE DRAWINGS

FIG. 5 is a diagrammatic view of the machining device of FIG. 4;

FIG. 6 shows an alternative embodiment of the machining apparatus; and

FIG. 7 shows a third embodiment of the machining apparatus.

DESCRIPTION OF THE PREFERRED EMBODIMENTS

Figure 1:
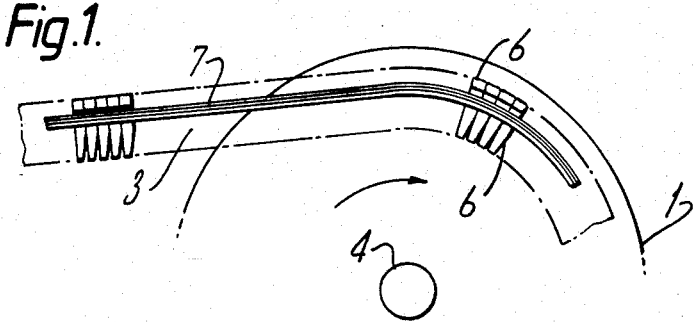
FIG. 1 is a cross sectional view through a pulley over which the driving belt travels.

The transmission belt 3 as shown in FIG. 1 includes a carrier 7 and plurality of transverse elements 6 mounted on the carrier. The belt 3 travels over two V-shaped pulleys one of which is shown in FIG. 1 and designated as 1. The pulley comprises two identical halves whereby the spacing between the sheaves of the pulley may be varied so as to attain a stepless variable transmission ratio. In such an arrangement, the torque is transmitted by means of a pushing force on the transverse element which is transferred through a number of transverse elements. It is understood that the tension of the carrier 7 is at all times greater than the pushing force transmitted by the transverse elements in a known manner as disclosed in U.S. Pat. No. 4,080,841.

Figure 2:
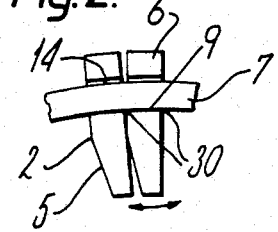
FIG. 2 is an enlarged sectional view of the transverse element of FIG. 1.

Referring to FIG. 1, as the pulley 1 rotates about its axis 4 the transverse elements enter between the sheaves of the pulley. As the transverse elements travel around the pulley they are forced slightly outward in the radial direction while simultaneously going through a tilting motion with respect to each other and the carrier 7. A cross-sectional view of this tilting movement is more clearly shown in FIG. 2. As can be seen this tilting movement is made possible by the tapered face 5 of the transverse element 6 along its lower face. As the transverse elements tilt with respect to one another and the carrier 7 bends due to the curvature of the pulley the contact surface 9 is lost to some degree. The outer edges 30 of the contact surface are influencing a greater force than the remaining areas of the surface 9 resulting in excessive wear to the transverse elements and a gouging effect on the carrier.

Figure 3:
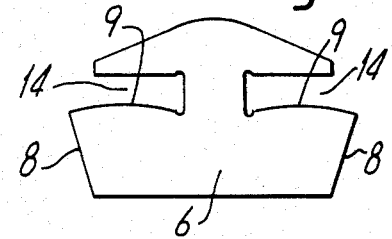
FIG. 3 is a front view of a machined transverse element.

The transverse elements may assume several shapes as disclosed in U.S. Pat. Nos. 4,080,841 and 4,299,586. An exemplary element is shown in FIG. 3 having a body 6 with tapered sides 8 which contact the inner faces of the V-shaped pulley. A pair of recesses 14 are provided in opposite sides of the element 6 to receive two carrier bands. An arcuate surface 9 in the transverse direction contacts the carrier during the rotation around the pulley.

In order to eliminate the adverse effects of the excessive wear of the contact area 9 and edges 30 on the transverse element and the carrier, the contact area 9 is produced with a convex surface as shown in FIG. 3. In addition to the convex shape in the transverse direction, the contact area 9 is provided with a convex surface in the longitudinal direction as shown in FIG. 6. This provides for a smooth side of the contact surface 9 on the carrier 7 and eliminates the excessive wear caused by the sharp edges 30.

Figure 4:
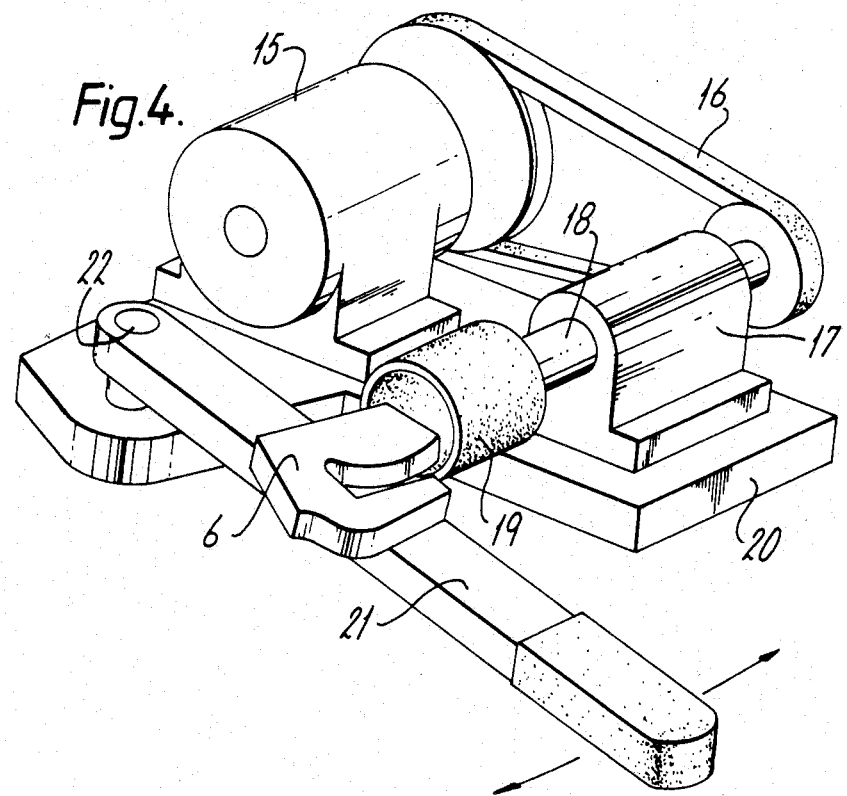
FIG. 4 is a perspective view of the machining apparatus.

One embodiment of producing the convex surface in both the transverse and longitudinal directions is shown in FIG. 4. A motor 15 drives a belt 16 to rotate the shaft 18 mounted within a bearing block 17 all disposed on a frame 20. A hollow cylindrical grinding wheel 19 is positioned on the shaft 18 for rotation. A transverse element 6 is secured through appropriate means to a swing arm 21 which pivots about a pin 22. An abrasive surface is provided in the hollow surface of the grinding wheel 19 and the dimensions of the grinding wheel are selected according to the desired arc on the finished transverse element. Thus the greater the diameter of the grinding wheel the greater the arc of the convex surface of the transverse element.

In operation, as can be seen from FIG. 4, the swing arm 21 with the transverse element mounted thereon by a suitable clamping means is pivoted such that the contact surface 9 contacts the inner hollow surface of the grinding wheel. Because the arm pivots the transverse element moves in an arcuate path with respect to the grinding wheel resulting in a convex surface being produced in the transverse direction. The curved inner surface of the grinding wheel produces a convex surface in the longitudinal direction. This process is better shown in FIG. 5 showing the arcuate movement of the arm 21 and the transverse element 6 during the grinding process.

A second embodiment is shown in FIG. 7 for machining a different type of transverse element having a single recess 13 to receive a single carrier. Holes, 11 and 12, are provided in the side members of the element to receive a locking pin 10. In order to machine the contact area of this type of transverse element, it is necessary to modify the grinding wheel.

A chuck 28 rotated by a shaft 30 is provided with an inwardly extending grinding or abrasive member 27. In operation the transverse element is secured to a pivoting swing arm such that the element moves in an arcuate path indicated by arrow 31 while contacting the abrading surface of member 27. Again the longitudinal convex surface is produced by the concave abrading surface and is determined by the diameter of grinding wheel. The transverse convex surface is produced by the arcuate movement of the transverse element and the resulting arcuate face is determined by the length of the swing arm.

An additional embodiment for producing the two mutually perpendicular convex surfaces is indicated in FIG. 6. The grinding wheel 23 is provided with a concave abrading surface corresponding to the resulting convex contact surface in the longitudinal direction of the transverse element. As can be seen in FIG. 6, the transverse element is moved in an arcuate path by a means as previously described to produce the convex face in the transverse direction as indicated by arrow 26.

It has been found that the transverse elements having been machined to produce the convex surfaces in two mutually perpendicular directions avoid the undesirable effects otherwise present. The elements arranged on a carrier having the two curved surfaces create a smaller load on the carrier. The convex shape of the edges come into contact with the carrier thus preventing the edges from exerting the abrading effects on the carrier. The smaller force is particularly noticeable upon the elements entering the pulley which causes the elements to tilt with respect to one another and the carrier.

In the foregoing, the invention has been described with the rotating grinding wheels remaining stationary and the transverse elements moving in an arcuate path. Within the purview of the invention is an embodiment in which the transverse element is held stationary during grinding while the grinding wheel is moved in an arcuate path. An example would be as shown in FIG. 4 in which two grinding wheels would be pivotally mounted on a swing arm where two surfaces on the transverse element could be machined simultaneously.

It will be apparent to those skilled in the art that various modifications and variations can be made in the grinding device and transverse element without departing from the scope or spirit of the invention.

What is claimed is:

1. Apparatus for grinding a plate-like element for a driving belt, the plate-like element having opposite faces, an edge and at least one recess for receiving a flexible endless carrier, the recess extending inwardly from the edge of the element and exhibiting at least one contact surface which contacts a flexible endless carrier when the carrier is fitted into the recess, said apparatus comprising: a rotatable open-ended hollow cylindrical grinding member having an annular wall with an inner abrading surface, the radial thickness of said wall being such that said wall can be received in the recess in said plate-like element in a position in which said abrading surface is engageable with the contact surface of the recess in the plate-like element, with a portion of the element residing outside said grinding member; support means for supporting a plate-like element to be machined; and means for effecting relative swinging movement between said support means and said cylindrical grinding member in an arcuate path about an axis which extends transversely to the axis of said cylindrical grinding member and which is located outside said grinding member, such swinging movement effecting movement of said wall of said grinding member into the recess in a plate-like element supported by said support means and effecting engagement of the contact surface of such element with said abrading surface to thereby grind the contact surface of such element so as to be convex in two mutually perpendicular directions.

* * * * *